(12) United States Patent
Rangaraj

(10) Patent No.: US 11,451,521 B2
(45) Date of Patent: Sep. 20, 2022

(54) SYSTEMS AND METHODS FOR ENCRYPTED DATA TRANSMISSION

(71) Applicant: PAYPAL, INC., San Jose, CA (US)

(72) Inventor: Srini Rangaraj, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 242 days.

(21) Appl. No.: 16/164,422

(22) Filed: Oct. 18, 2018

(65) Prior Publication Data

US 2020/0127982 A1 Apr. 23, 2020

(51) Int. Cl.
*H04L 9/40* (2022.01)
*H04L 9/08* (2006.01)
*H04L 9/30* (2006.01)

(52) U.S. Cl.
CPC ........ *H04L 63/0442* (2013.01); *H04L 9/0825* (2013.01); *H04L 9/30* (2013.01); *H04L 63/061* (2013.01); *H04L 63/166* (2013.01); *H04L 63/18* (2013.01); *H04L 63/20* (2013.01)

(58) Field of Classification Search
CPC ..... H04L 9/08; H04L 9/14; H04L 9/30; H04L 47/34; H04L 63/08; H04L 63/16; H04L 63/18; H04L 63/20; H04L 63/105; H04L 63/0442; H04L 63/0435; H04L 9/0825; H04L 63/061; G06F 7/00; G06F 17/10; G06F 21/10; G06F 21/71; G06F 21/72
See application file for complete search history.

(56) References Cited

U.S. PATENT DOCUMENTS

| | | | |
|---|---|---|---|
| 5,488,659 A | 1/1996 | Miliani | |
| 8,447,970 B2 | 5/2013 | Klein et al. | |
| 9,191,200 B1 | 11/2015 | Adams et al. | |
| 9,444,620 B1 | 9/2016 | Murphy et al. | |
| 9,774,630 B1 * | 9/2017 | Karnin, III | H04L 63/0428 |
| 2003/0223579 A1 | 12/2003 | Kanter et al. | |
| 2005/0033963 A1 * | 2/2005 | Ronchi | H04L 9/3226 713/170 |
| 2006/0036852 A1 * | 2/2006 | Leung | H04L 69/04 713/160 |
| 2007/0076868 A1 * | 4/2007 | Ming | G09C 5/00 380/54 |
| 2008/0289027 A1 * | 11/2008 | Yariv | H04L 63/0227 726/11 |
| 2010/0142705 A1 | 6/2010 | Reffe | |
| 2011/0099591 A1 * | 4/2011 | Long | H04N 21/4122 725/81 |
| 2017/0061138 A1 * | 3/2017 | Lambert | H04L 63/0428 |
| 2017/0250796 A1 | 8/2017 | Samid | |
| 2018/0270052 A1 | 9/2018 | Cullen | |
| 2020/0028673 A1 * | 1/2020 | Howe | H04L 9/0852 |

* cited by examiner

*Primary Examiner* — Dao Q Ho
(74) *Attorney, Agent, or Firm* — Haynes and Boone, LLP

(57) ABSTRACT

Systems and methods for message encryption include transmitting, to a first device through a first communication channel, a modification rule message including a modification rule. A first message is encrypted using a first key to generate an encrypted message. The encrypted message is modified based on the modification rule to generate a modified encrypted message. The modified encrypted message is transmitted to the first device through a second communication channel.

20 Claims, 13 Drawing Sheets

SYSTEMS AND METHODS FOR ENCRYPTED DATA TRANSMISSION

BACKGROUND

Technical Field

The present disclosure generally relates to encrypted data transmission, and more particularly to encryption of messages for electronic transmission, according to various embodiments.

Related Art

More and more consumers are conducting electronic transactions, such as purchasing items and services, via computing devices over electronic networks such as, for example, the Internet. Consumers routinely purchase products and services from merchants and individuals alike. The transactions may take place directly between a physical or on-line merchant or retailer and the consumer, and payment is typically made by entering credit card or other funding source information. Transactions may also take place with the aid of an online or mobile service provider such as, for example, PayPal, Inc. of San Jose, Calif. Such service providers can make transactions easier and safer for the parties involved. Purchasing with the assistance of a service provider from the convenience of virtually anywhere using a mobile device is one main reason why on-line and mobile purchases are growing very quickly.

Privacy and security of information transmission is critical for these on-line and mobile transactions. Various cryptographic techniques have been used to provide secure information transmission. However, conventional cryptographic techniques are susceptible to attacks. For example, symmetric-key algorithms for cryptography that use the same cryptographic keys for both encryption of plaintext and decryption of ciphertext may be susceptible to various attacks including for example, known-plaintext attacks, chosen-plaintext attacks, differential cryptanalysis and linear cryptanalysis. For further example, an asymmetric key algorithm (also known as public key algorithm) that uses a pair of public key and private key may be susceptible to various attacks including for example, a side channel attack and a "man-in-the-middle" attack. Additionally, a typical asymmetric key algorithm is relatively computationally costly compared with most symmetric key algorithms of similar security.

Thus, there is a need for improvements to conventional cryptographic techniques for improved security and reduced computational cost.

Figure 1:
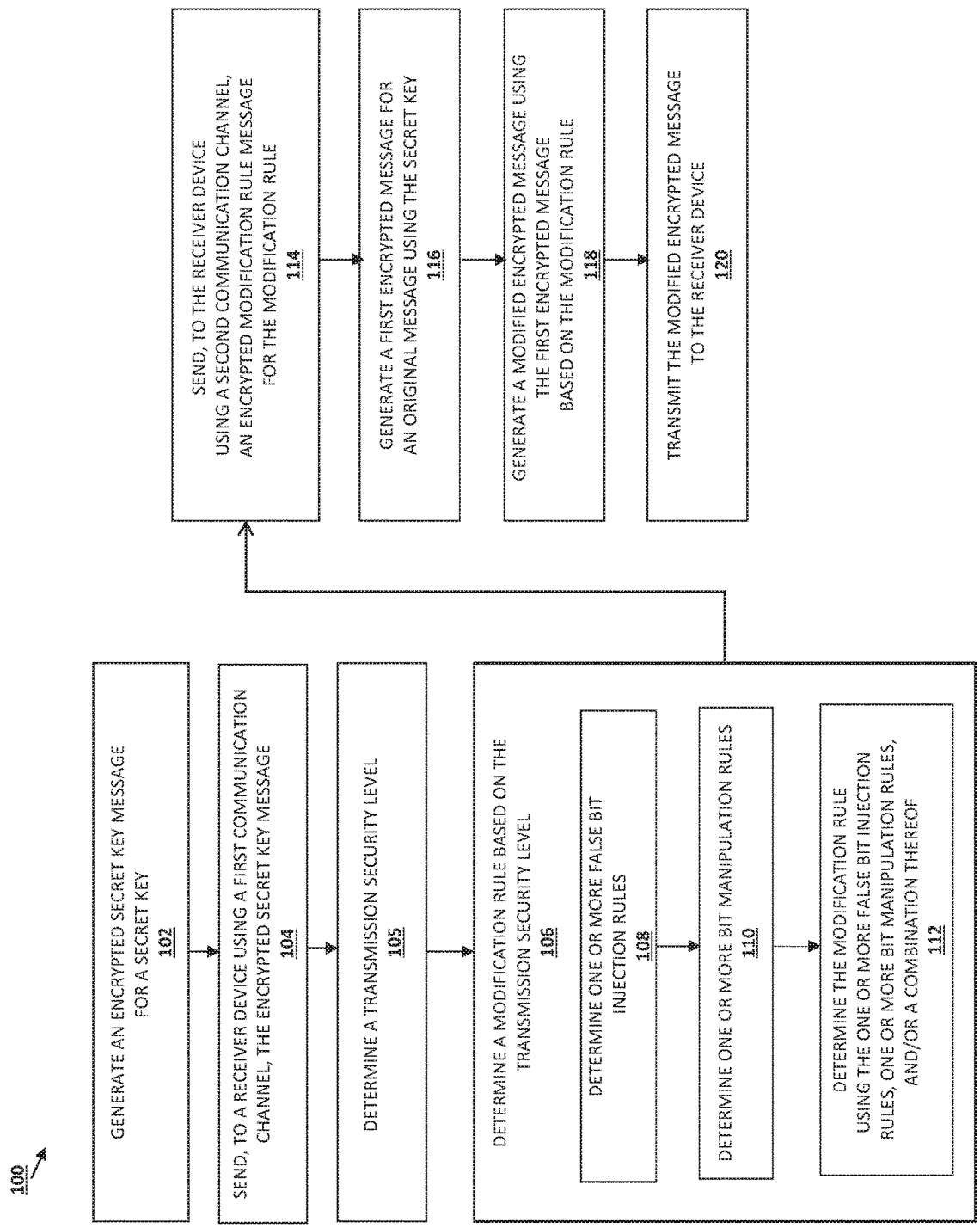
FIG. 1 is a flow chart illustrating a method for message encryption in accordance with an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for secure data or information transmission, for example, for transactions conducted through one or more computing devices. Various computing devices may be used by a user to perform various tasks such as, for example, transferring funds, taking an online course, playing computer games, reading news/blogs, shopping, and/or performing any other suitable online transactions. Privacy and security of information is critical for these transactions. Various cryptographic techniques may be used to provide secure information transmission.

In various embodiments described below, a sender device may perform additional modifications (e.g., false bit injection, bitwise operations, etc.) to encrypt messages according to modification rules (e.g., false bit injection rules, bit manipulation rules, any other suitable rules, and/or a combination thereof) to generate a modified encrypted message. The modification rules may be transmitted to a receiver device using a communication channel that is different from the communication channels for key exchange or message transmission. As such, a receiver device may receive the encrypted message, a secret key, and the modification rules using different communication channels, and perform message decryption to the received encrypted message using the secret key and the modification rules. By applying the additional modification to the encrypted message and communicating the encrypted message, a secret key, and the modification rules using different communication channels, the difficulty for attackers to break the cryptography increases. Furthermore, the modification rules may be changed dynamically (e.g., based on transmission security levels, a predetermined rotation frequency, network properties, transaction properties, transmission security risks, etc.), which further improves the security of the information transmission. Additionally, in some embodiments, a less complicated modification rule or no modification rule is applied with transmissions having a lower security risk or a lower transmission security level, and a more complicated modification rule is applied for transmissions having a higher security risk or a higher transmission security level, which reduces process time and improve system operating efficiency.

Figure 2:
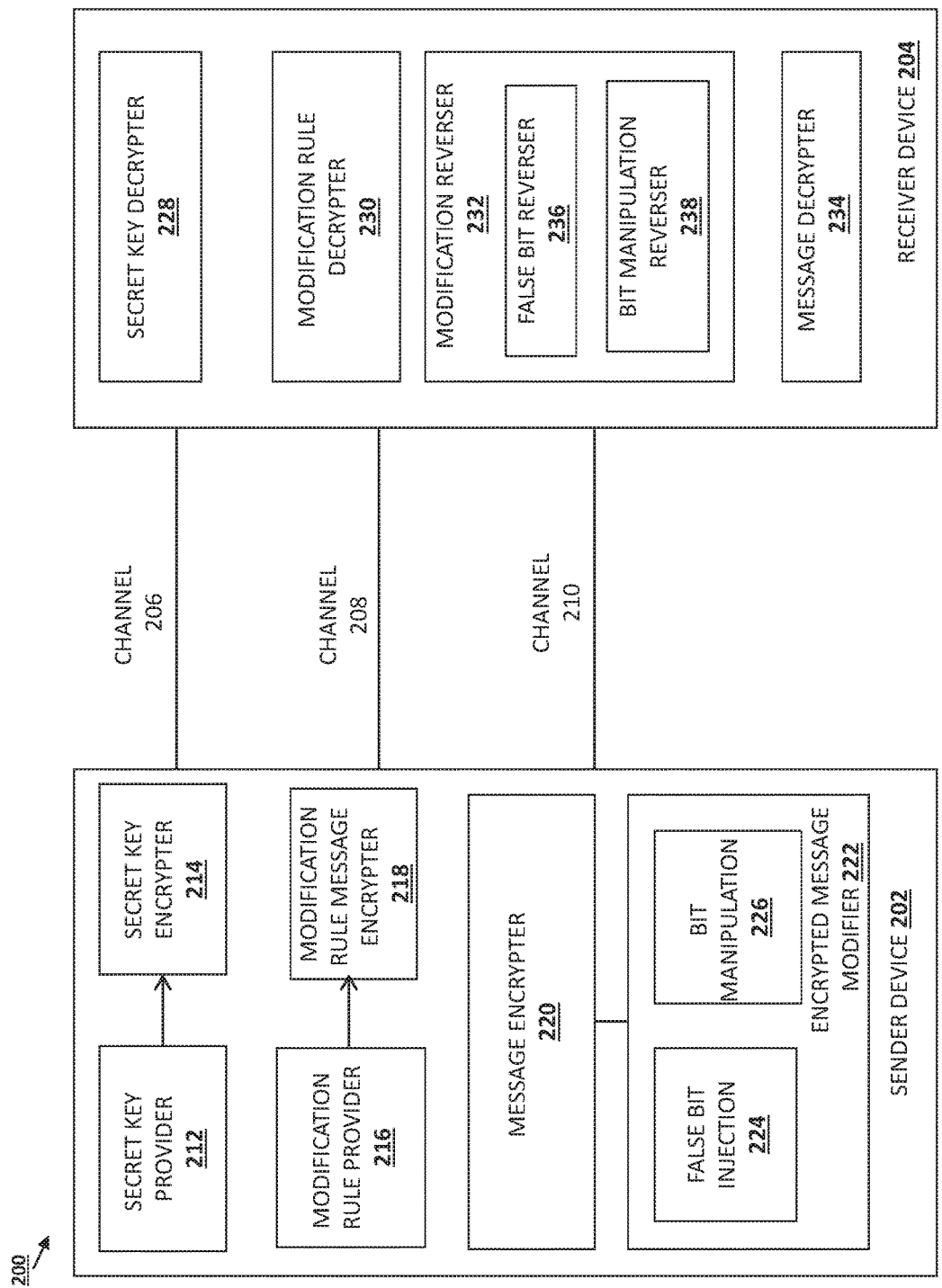
FIG. 2 is a schematic illustrating a transmission system including a sender device and a receiver device in accordance with an embodiment.

Referring to FIG. 1, an embodiment of a method 100 for providing encrypted messages is illustrated. Referring to FIGS. 1 and 2, the method may begin at block 102, where a secret key message is generated based on a secret key for message transmission between a sender device and a receiver device.

Referring to FIG. 2, an embodiment of a transmission system including a sender device and a receiver device is illustrated. As illustrated in FIG. 2, a transmission system 200 including a sender device 202 and a receiver device 204 may communicate through various network communication channels 206, 208, and 210. Each of the network communication channels 206, 208, and 210 may be a communication channel using one or more of an electronic mail service, through a webpage, a wired or wireless phone, fax, text or instant messaging services, chat services, social networking, or a Secure File Transfer Protocol (SFTP).

A secret key provider 212 of the sender device 202 may generate a secret key for message transmission between the sender device 202 and receiver device 204. In some examples, the secret key may be a session key applicable to a single information exchange session. In some examples, the secret key may be a key applicable to a plurality of information exchange sessions. A secret key encrypter 214 may receive the secret key from the secret key provider 212, and generate an encrypted secret key message using the secret key and a receiver device public key (e.g., provided by the receiver device 204).

The method 100 may then proceed to block 104, where the sender device may send the secret key message to the receiver device using a communication channel. Referring to FIG. 2, the sender device 202 may send the secret key message provided by the secret key encrypter 214 to the receiver device 204 using a communication channel 206. It is noted in various embodiments, various algorithms and protocols may be used for exchanging the secret key between the sender device 202 and receiver device 204, including for example, a SSL handshake, secret key sharing, etc.

The method 100 may then proceed to block 105, where the sender device 202 determines a transmission security level associated with transmitting a message over a network. The transmission security level may be determined based on various factors including for example, network/communication channel properties, properties associated with the sender device and/or receiver device, properties (e.g., transaction time, transaction type) of a transaction associated with the message, transaction history associated with the sender device, receiver device, transaction users, transaction service providers, etc. In an example, the sender device 202 may determine (e.g., based on a transaction risk rule) that a particular transaction performed during holiday seasons has a higher security risk than transactions performed during other times of the years, and as such, requires a higher transmission security level. In another example, the sender device 202 may determine that a message associated with a payment transaction requires a higher transmission security level than another message associated with a transaction for viewing digital content. In yet another example, the sender device 202 may determine that a message to be transmitted over a public wireless network requires a higher transmission security level than another message to be transmitted over a private wireless network. The various properties (e.g., network properties, device properties, transaction properties, transaction history, etc.) for determining the transmission security level may be provided by one or more third party service provider devices. In some embodiments, a third-party service provider may determine a transmission security level, and provide that transmission security level for the sender device 202.

The method 100 may then proceed to block 106, where a modification rule provider 216 of a sender device 202 may determine a modification rule based on the transmission security level. In some examples, a more secure (e.g., more complicated) modification rule may be provided based on a higher transmission security level, and a less secure (e.g., simpler) modification rule may be provided based on a lower transmission security level.

Block 106 may include processes 108, 110, and 112, each of which may be performed by the modification rule provider 216. A modification rule may be used to modify encrypted messages (e.g., encrypted using the secret key) for improved security as described in detail below. The modification rule may include various types of sub-modification rules including for example, a false bit injection rule, a bit manipulation rule, any other suitable message modification rules, and/or combination thereof. At block 108, the modification rule provider 216 may determine one or more false bit injection rules for injecting false bits to an encrypted message. A false bit injection rule may include various false bit injection parameters, including for example, a false bit pattern (e.g., "01") and an injection location (e.g., every 8 bits) indicating that the false bit pattern may be injected after each 8 bits of an encrypted message. In some embodiments, the false bit injection rule may include a sequence of false bit patterns (e.g., "01," "111," "101111"), and these multiple false bit patterns may be used in rotation. For example, the false bit injection rule may provide that a first false bit pattern (e.g., "01") may be inserted after 8 bits of an encrypted message, a second false bit pattern (e.g., "111") may be inserted after the following 8 bits of the encrypted message, and a third false bit pattern (e.g., "101111") may be inserted after another following 8 bits of the encrypted message. In some examples, a more secure false bit injection rule (e.g., using a longer false bit pattern, a shorter distance between two adjacent injection locations, a longer sequence of false bit patterns for rotation) may be provided for transmissions with a higher transmission security level.

At block 110, the modification rule provider 216 may determine one or more bit manipulation rules for manipulating bit values (e.g., using bitwise operations) of an encrypted message. A bit manipulation rule may include various bit manipulation parameters, including for example, a bitwise operation and a bit manipulation location indicating a location of the bit(s) in an encrypted message that the bitwise operation is performed on. For example, a NOT bit manipulation rule may provide that a bitwise operation NOT is performed to a bit manipulation position (e.g., every $12^{th}$ bit of a message). For further example, a swap bit manipulator rule may provide that a bitwise operation of swap two bits at bit manipulation positions that are adjacent (e.g., every adjacent $11^{th}$ and $12^{th}$ bits of a message) or not adjacent to each other (e.g., every $10^{th}$ and $12^{th}$ bits of a message). In some examples, a more secure bit manipulation rule (e.g., with a higher manipulated bit ratio) may be provided for transmissions with a higher transmission security level.

At block 112, the modification rule provider 216 may determine the modification rule using the sub-modification rules including the one or more bit manipulation rules, one or more bit manipulation rules, and/or any other suitable message modification rules. In some embodiments, a more secured modification rule (e.g., with a combination of different types of sub-modification rules) may be determined based on a higher transmission security level for a message. For example, a first modification rule for a higher transmission security level may include a sequence including one or more false bit injection rules and one or more bit manipulation rules, while a second modification rule for a lower transmission security level may include only a single sub-transmission rule (e.g., a first modification rule or a bit manipulation rule).

The method 100 may then proceed to block 114, where an encrypted modification rule message for the modification rule is sent to the receiver device using a second communication channel. Referring to FIG. 2, in some embodiments, a modification rule message encrypter 218 of the sender device 202 may receive the modification rule from the modification rule provider 216, and encrypt the modification rule to generate an encrypted modification rule message using a receiver device public key (e.g., provided by the receiver device 204). The sender device 202 may send the encrypted modification rule message provided by the modification rule message encrypter 218 to the receiver device 204 using a communication channel 208. In some embodiments, the encrypted modification rule message and the encrypted secret key message may be sent using the same communication channel. Alternatively, in some embodiments, the encrypted modification rule message and the encrypted secret key message may be sent using different communication channels for improved security. It is noted that while an encrypted modification rule message is used in the example of FIG. 2, in some embodiments, the modification rule may be sent to the receiver device 204 without encryption.

The method 100 may then proceed to block 116, where a first encrypted message for an original message is generated using the secret key. In the example of FIG. 2, a message encrypter 220 may encrypt an original message to generate a first encrypted message using the secret key. Various encryption algorithms may be used, including for example, Advanced Encryption Standard (AES), Serpent, Blowfish, Data Encryption Standard (DES), etc. Referring to the example of FIG. 3, a message encrypter 220 may encrypt an original message 302 (e.g., "101101100110011") using a secret key, and generate a first encrypted message 304 (e.g., "0101000101011100011000011110001").

The method 100 may proceed to block 118, where a modified encrypted message is generated using the first encrypted message based on the modification rule. In an example, an encrypted message modifier 222 of sender device 202 of FIG. 2 modifies the first encrypted message using a modification rule provided by the modification rule provider 216.

Figure 3:
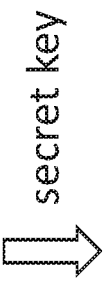
FIG. 3 illustrates message encryption by a sender device in accordance with an embodiment.

In some embodiments, as shown in the example of FIG. 3, the modification rule includes a false bit injection rule 308 providing that a false bit pattern (e.g., "01") is inserted after every 8 bits. A modified encrypted message 306 (e.g., "010100010101011100010110000101110001") is generated by the encrypted message modifier 222 (e.g., using a false bit injection unit 224) based on the false bit injection rule 308, by injecting false bits 310 to the encrypted message 304.

Figure 4:
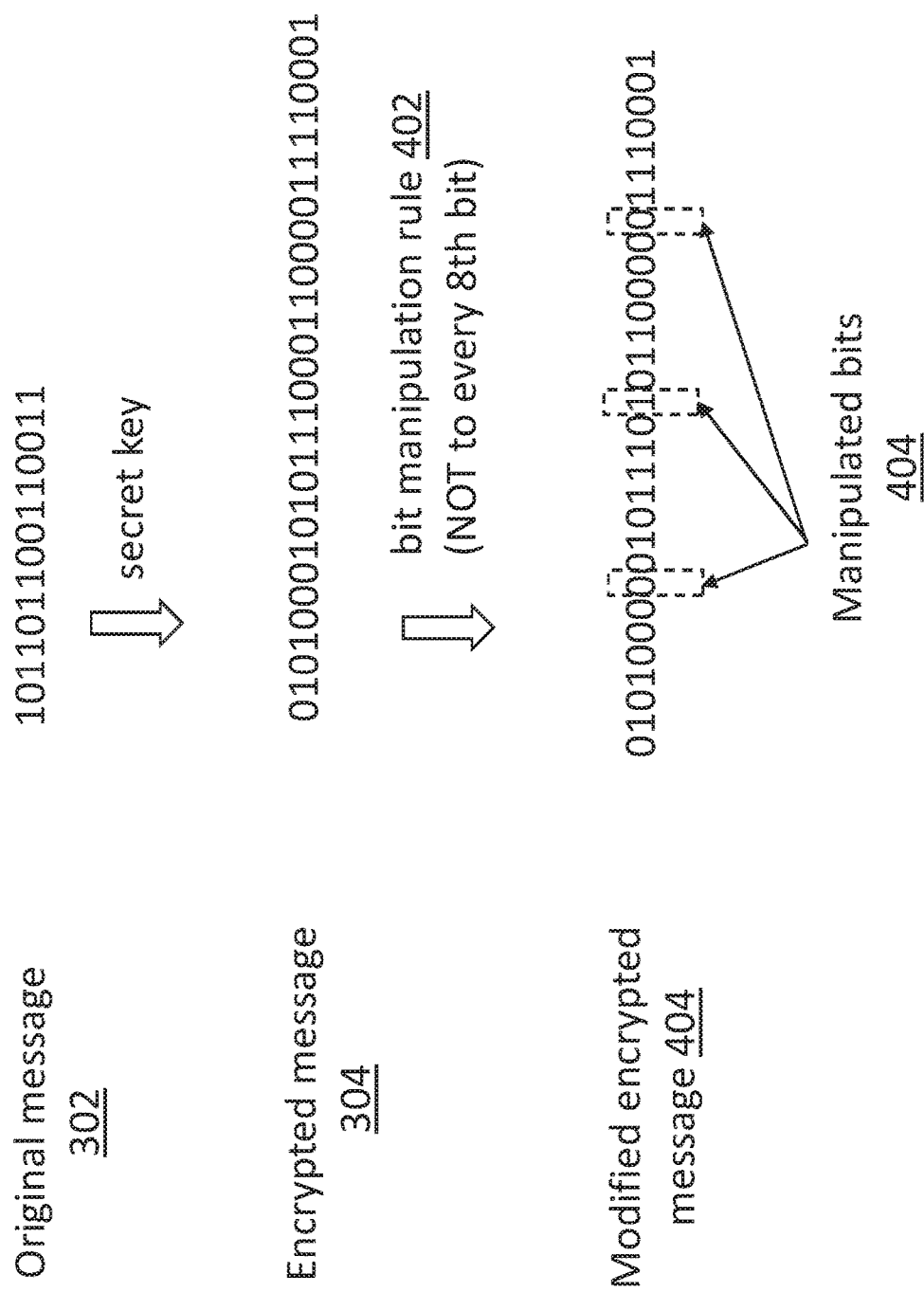
FIG. 4 illustrates message encryption by a sender device in accordance with another embodiment.

In some embodiments, as shown in the example of FIG. 4, the modification rule includes a bit manipulation rule 402 providing that a NOT operation is applied for every $8^{th}$ bit of the encrypted message. A modified encrypted message 404 (e.g., "0101000001011010110000011110001") including manipulated bits 404 is generated by the encrypted message modifier 222 (e.g., using a bit manipulation unit 226) based on the bit manipulation rule 402, by performing NOT to every $8^{th}$ bit of the encrypted message 304. In other words, the NOT operation reverses every $8^{th}$ bit, e.g., from 1 to 0 or from 0 to 1.

Figure 5:
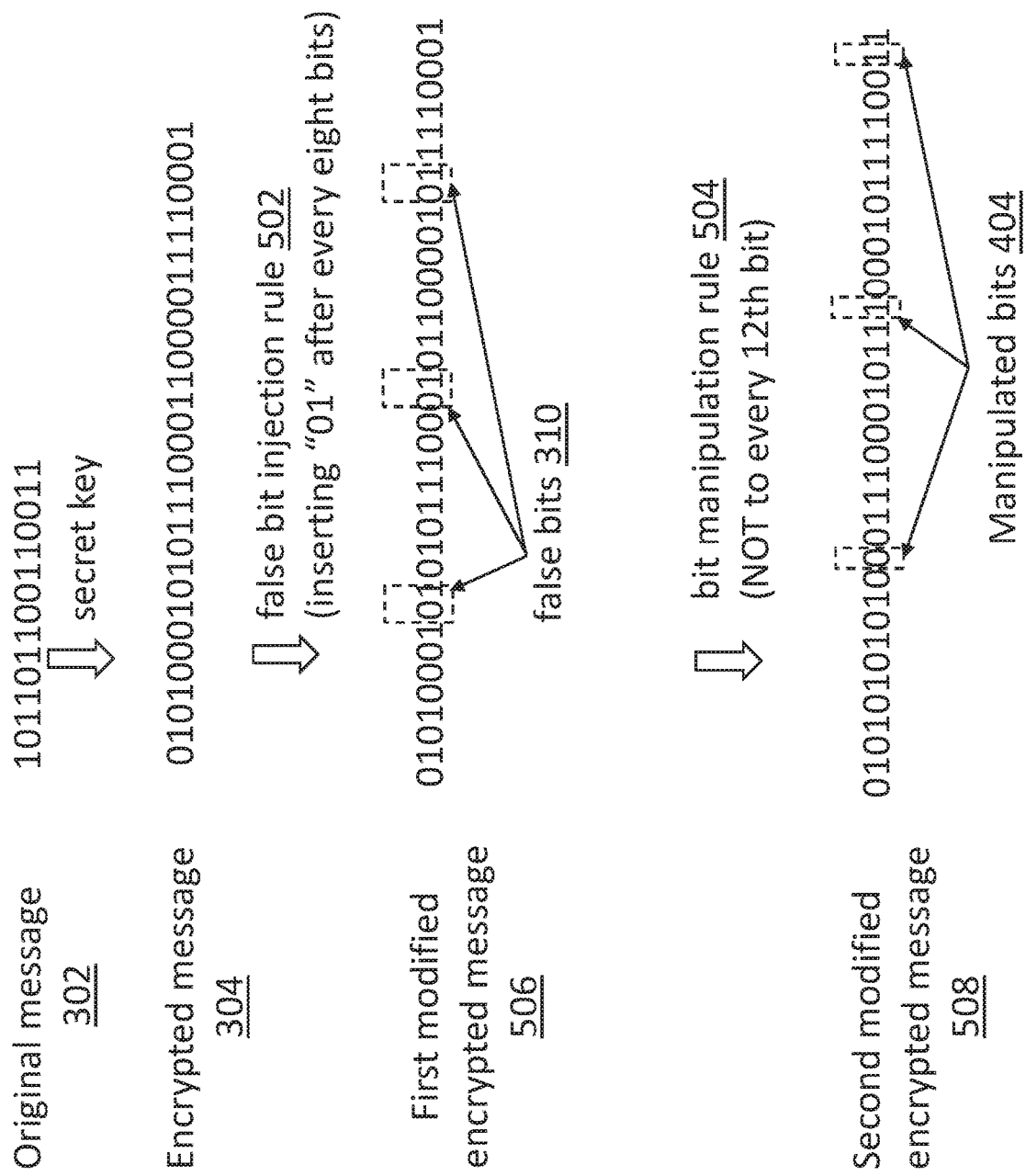
FIG. 5 illustrates message encryption by a sender device in accordance with yet another embodiment.

In some embodiments, as shown in the example of FIG. 5, the modification rule includes a false bit injection rule 502 followed by a bit manipulation rule 504. A first modified encrypted message 506 (e.g., "010100010101011100010110000101110001") is generated by the encrypted message modifier 222 (e.g., using a false bit injection unit 224) based on the false bit injection rule 502, by injecting false bits 310 to the encrypted message 304. A second modified encrypted message 508 (e.g., "010101010100011100010111000101110011") is generated by the encrypted message modifier 222 (e.g., using a bit manipulation unit 226) based on the bit manipulation rule 504, by performing NOT to every $12^{th}$ bit of the first modified encrypted message 506. While in the example of FIG. 5, the bit manipulation rule 504 manipulates bits of the encrypted message 304 without manipulating the injected false bits, in various embodiments, a bit manipulation rule may manipulate bits including the bits of the encrypted message 304, injected false bits 310, and/or a combination thereof. For example, a bit manipulation rule may indicate a swap operation to swap a bit of the encrypted message 304 (e.g., the $6^{th}$ bit of first modified encrypted message 506) and an injected false bit (e.g., the $9^{th}$ bit of the first modified encrypted message 506).

The method 100 may proceed to block 120, where the sender device 202 sends a modified encrypted message (e.g., modified encrypted messages 306, 404, 508) provided by the encrypted message modifier 222 through a communication channel 210. In some embodiments, the modified encrypted message may be sent using the same communication channel as the communication channel for the encrypted modification rule message and/or the encrypted secret key message. Alternatively, in some embodiments, the modified encrypted message may be sent using a communication channel different from the communication channel for the encrypted modification rule message and/or the encrypted secret key message for improved security.

Figure 6:
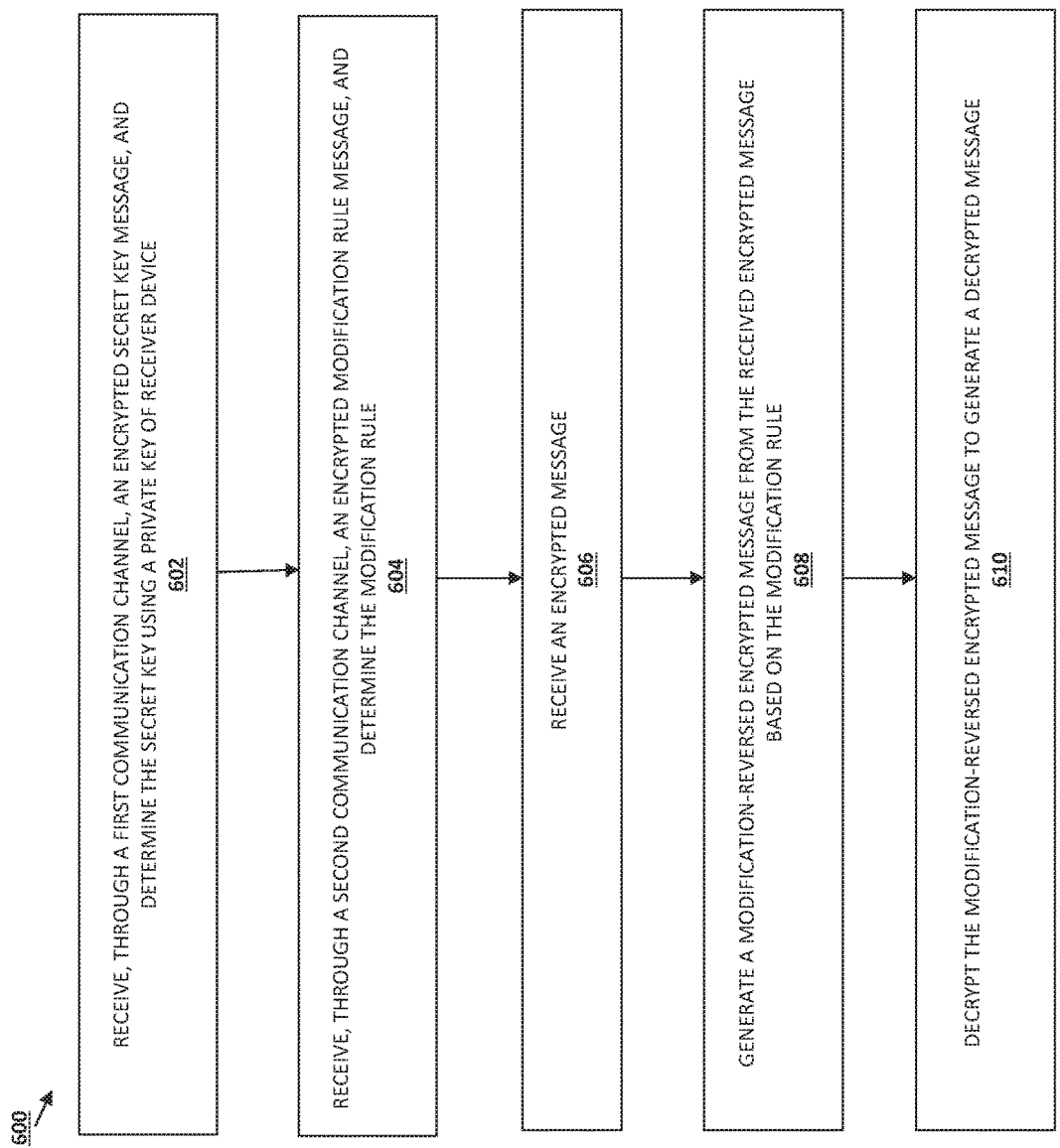
FIG. 6 is a flow chart illustrating an embodiment of a method for message decryption in accordance with an embodiment.
Figure 7:
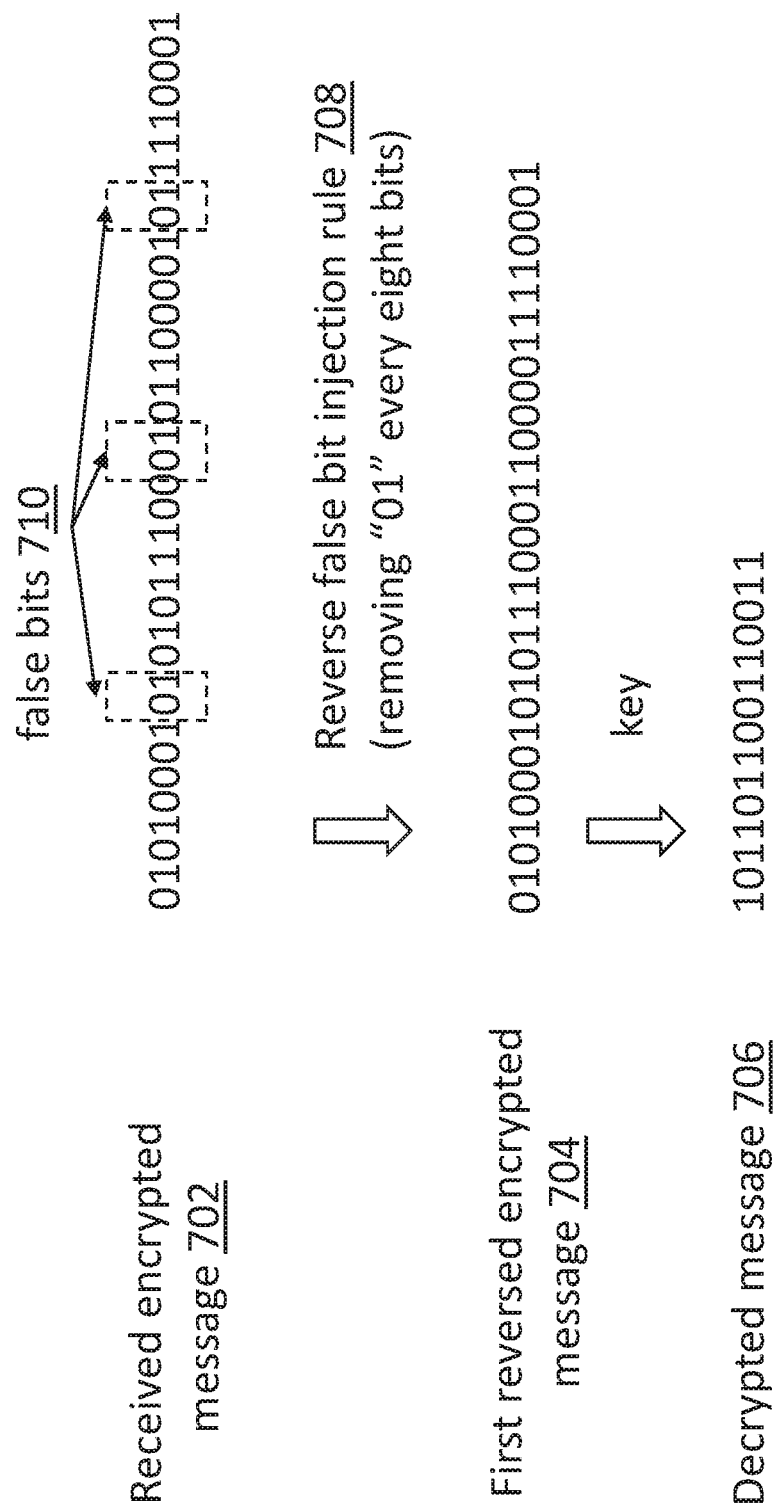
FIG. 7 illustrates message decryption by a receiver device in accordance with an embodiment.
Figure 8:
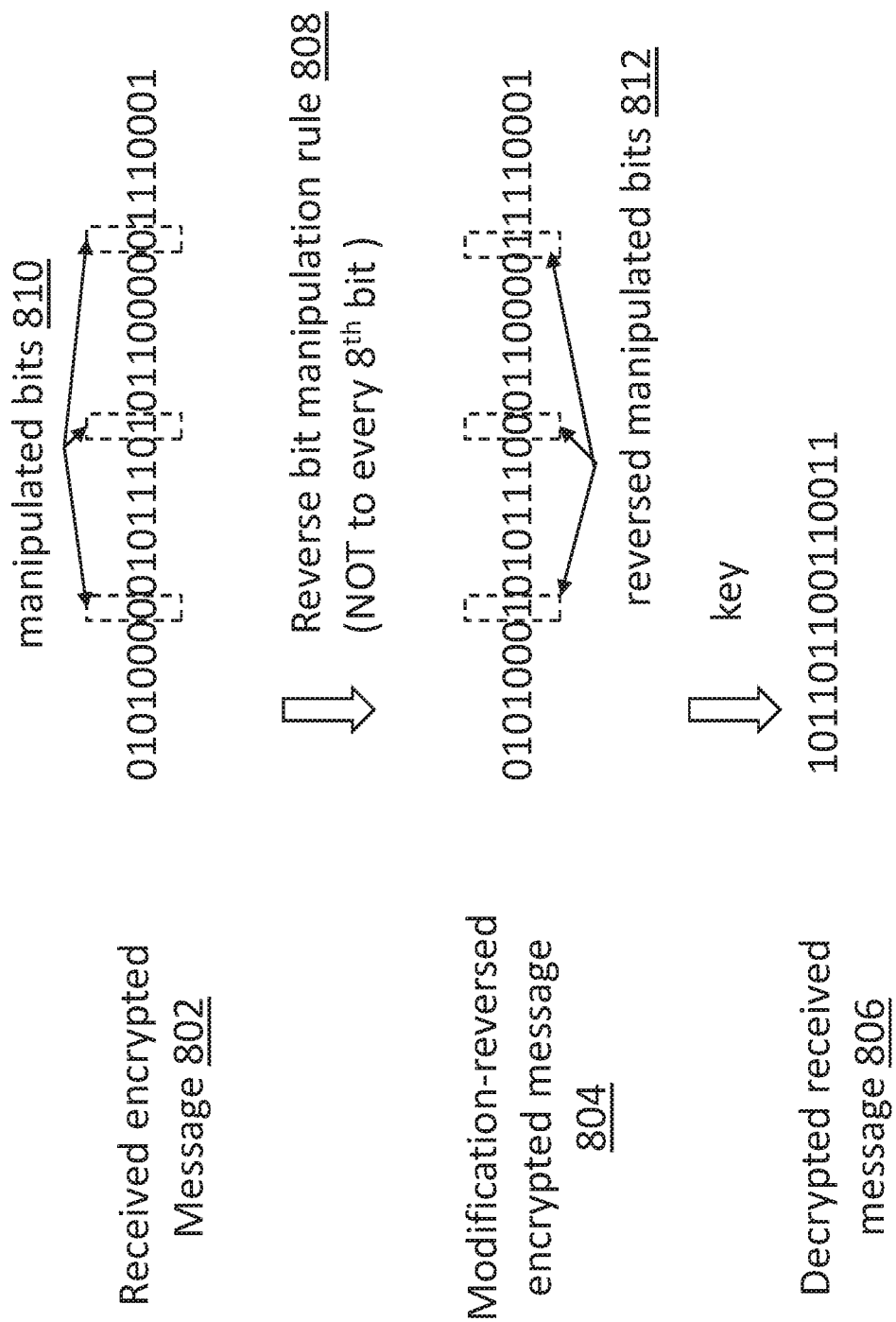
FIG. 8 illustrates message decryption by a receiver device in accordance with another embodiment.
Figure 9:
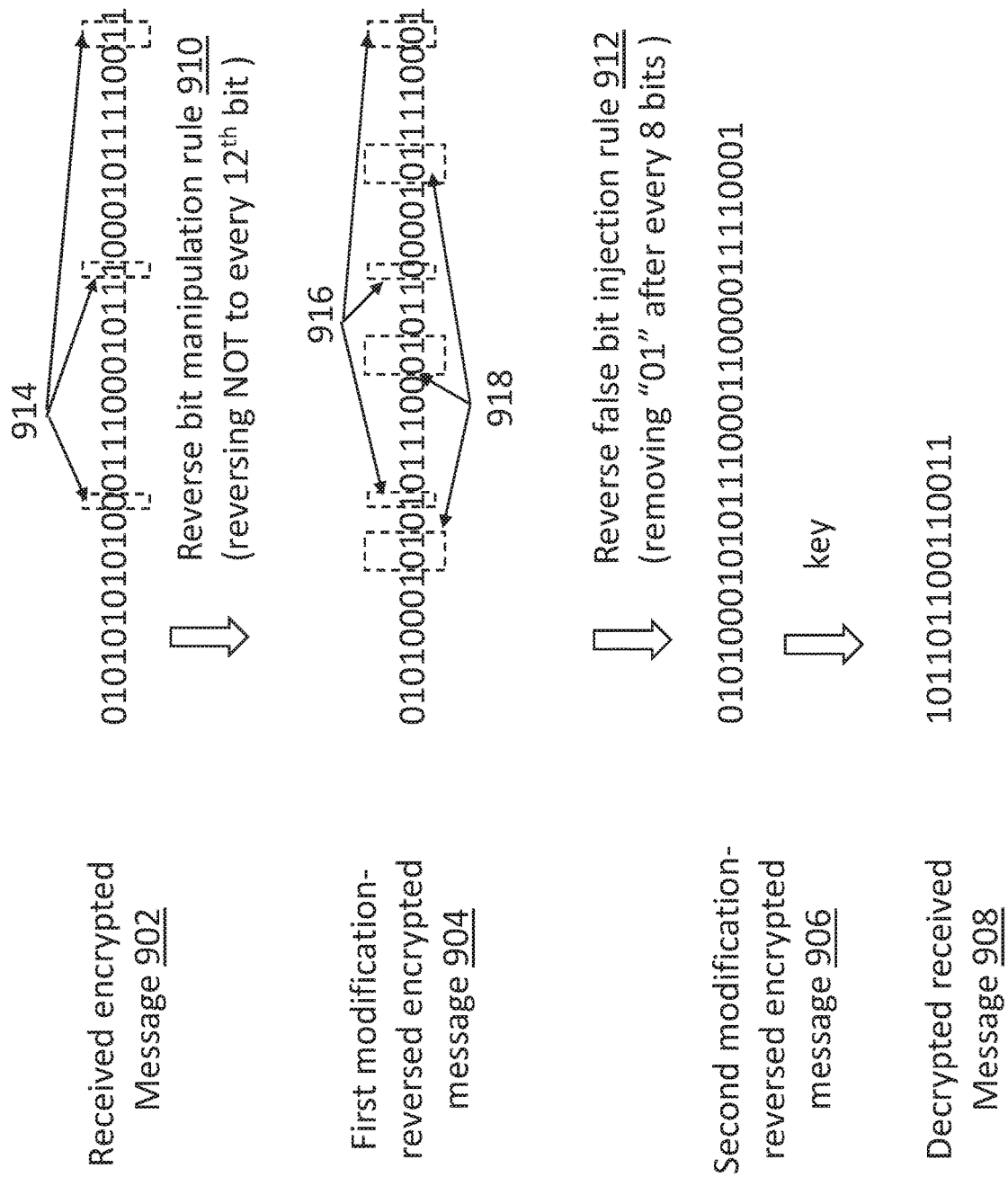
FIG. 9 illustrates message decryption by a receiver device in accordance with yet another embodiment.

Referring to the examples of FIGS. 6, 7, 8, and 9, a receiver device may receive an encrypted message and decrypt the received encrypted message based on the modification rule. The example of FIG. 6 illustrates a method 600 for message decryption, while FIGS. 7, 8, and 9 illustrate message decryption based on different modification rules.

The method 600 may begin at block 602, where a receiver device 204 receives from the sender device 202, an encrypted secret key message through a first communication channel 206. In some embodiments, at block 602, a secret key decrypter 228 of the receiver device 204 decrypts the encrypted secrete key message to determine the secret key using a private key associated with the receiver device 204.

The method 600 may proceed to block 604, where the receiver device 204 receives from the sender device 202, an encrypted modification rule message through a second communication channel 208. At block 604, a modification rule decrypter 230 of the receiver device 204 decrypts the encrypted modification rule message to determine the modification rule using a private key associated with the receiver device 204. In some embodiments, the modification rule may be sent from the sender device 202 to the receiver device 204 without encryption. In those embodiments, the receiver device 204 does not perform decryption to the received modification rule.

The method 600 may proceed to block 606, where the receiver device 204 receives from the sender device 202, an encrypted message through a third communication channel 210.

The method 600 may then proceed to block 608, where a modification reverser 232 of the receiver device 204 reverses the modification associated with the received encrypted message based on the modification rule, and generates a modification-reversed encrypted message. The modification reverser 232 may include various reverser units including for example, false bit reverser 234 for reversing the false bit injection, and bit manipulation reverser for reversing the bit manipulation.

In some embodiments, as shown in the example of FIG. 7, the modification rule includes a false bit injection rule 308 of FIG. 3 providing that a false bit pattern (e.g., "01") is inserted after every 8 bits. The modification reverser 232 may determine a reverse false bit injection rule 708 corresponding to the false bit injection 308, which provides that the false bit pattern (e.g., "01") is removed at the false bit insertion locations (e.g., at the last two bits of every 10 bits). The modification reverser 232 may apply the reverse false bit injection rule 708 to a received encrypted message 702 (e.g., "01010001010101110001011000010111110001") by removing the injected false bits 710, and generate a modification-reversed encrypted message 704 (e.g., "010100010101110001100001111110001").

In some embodiments, as shown in the example of FIG. 8, the modification rule includes a bit manipulation rule 402 of FIG. 4 providing that a NOT operation is applied for every $8^{th}$ bit of the encrypted message. The modification reverser 232 may determine a reverse bit manipulation rule 808 corresponding to the bit manipulation rule 402, which provides that manipulated bits 810 in the received encrypted message 802 are to be reversed using a NOT operation, which is a reverse operation of the NOT operation of the bit manipulation rule 402. The modification reverser 232 applies the reverse bit manipulation rule 808 to a received encrypted message 802 (e.g., "0101000001011101011000001110001") by reversing the manipulated bits 810 to reverse manipulated bits 812, and generate a modification-reversed encrypted message 804 (e.g., "010100010101110001100001111110001").

In some embodiments, as shown in the example of FIG. 9, the modification rule includes a false bit injection rule 502 followed by a bit manipulation rule 504 of FIG. 5. The modification reverser 232 may determine a reverse modification rule including a reverse bit manipulation rule 910 followed by a reverse false bit injection rule 912. Specifically, the reverse bit manipulation rule 910 corresponds to the bit manipulation rule 504, and the reverse false bit injection rule 912 corresponds to the false bit injection rule 502. It is noted that reverse false bit injection rule 912 is applied after the reverse bit manipulation rule 910, which is in a reversed order compared to the order of the corresponding false bit injection rule 502 and bit manipulation rule 504 of the modification rule.

As shown in the example of FIG. 9, the modification reverser 232 first applies the reverse bit manipulation rule 910 to the received encrypted message 902 (e.g., "010101010100011100010111000101111110011") by reversing the manipulated bits 914 to reversed manipulated bits 916, and generates a first modification-reversed encrypted message 904 (e.g., "0101000101010111000101100001011110001").

The modification reverser 232 then applies the reverse false bit injection rule 912 to the first modification-reversed encrypted message 904 by removing the injected false bits 918, and generates a second modification-reversed encrypted message 906 (e.g., "01010001010111000110000111110001"). As described in detail below, the second modification-reversed encrypted message 906 may be decrypted to generate a decrypted message of the received encrypted message 902.

It is noted while in the embodiments described above, the receiver device 204 receives a modification rule (with or without encryption) from the sender device 202, in some embodiments, the sender device 202 may determine the reverse modification rule, and send the reverse modification rule to the receiver device 204. In those embodiments, the modification reverser 232 of the receiver device 204 may directly apply the reverse modification rule without generating it from a modification rule.

The method 600 may proceed to block 610, where the modification-reversed encrypted message (e.g., modification-reversed encrypted messages 704, 804, 906) is decrypted using a decryption key to generate a decrypted received message. In the example of FIG. 7, decryption is performed to the modification-reversed encrypted message 704 using the secret key that is the same secret key for encryption of the corresponding message at the sender device 202, and a decrypted received message 706 (e.g., "101101100110011") is generated. In the example of FIG. 8, decryption is performed to the modification-reversed encrypted message 804 using the secret key that is the same secret key for encryption of the corresponding message at the sender device 202, and a decrypted received message 806 is generated. In the example of FIG. 9, decryption is performed to the modification-reversed encrypted message 906 using the secret key that is the same secret key for encryption of the corresponding message at the sender device 202, and a decrypted received message 908 is generated.

It is noted that while in the examples of FIGS. 7, 8, and 9, at block 610, the cryptographic key (secret key) for decryption is the same as the secret key for encryption of the corresponding message at the sender device 202, in some embodiments (e.g., using asymmetric key encryption algorithms), the cryptographic key for decryption at the receiver device 204 may be different from the cryptographic key for the corresponding encryption at the sender device 202. Asymmetric key encryption algorithms use a pair of public key and private key of a receiver device 204, where a sender device 202 uses the public key for encryption of plain text, and the receiver device 204 uses the private key for decryption of the corresponding ciphertext. In those embodiments where asymmetric key encryption algorithms are used, at block 610, a receiver device 204 may use its private key for decryption. In some embodiments, symmetric-key algorithms may be used, which use the same cryptographic keys (secret key) for both encryption of plaintext at the sender device 202 and decryption of ciphertext at the receiver device 204. In those embodiments, the secret key may be transmitted between the sender device 202 and receiver device 204 using an asymmetric key encryption algorithm as discussed at blocks 102, 104 of method 100 and block 602 of method 600.

It is noted that while online transactions (e.g., a payment transaction, transactions for taking an online course, playing computer games, viewing digital content such as news/ blogs, shopping) are used as examples for secure information transmission, the methods 100 and 600 using modified encrypted messages may be used to improve security for any electronic communication. Furthermore, various modification configurations may be applied to a communication system. In some embodiments, for communications between first and second devices, a modification rule for encrypted messages is applied to one direction (e.g., from the first device to the second device, from a server/merchant device to a client/user device) but not the other direction (e.g., from the second device to the first device, from a client/user device to a server/merchant device). In some embodiments, a first modification rule is applied to one direction (e.g., from the first device to the second device, from a server/merchant device to a client/user device), and a second modification rule that is different from the first modification rules is applied to the other direction (e.g., from the second device to the first device, from a client/user device to a server/merchant device). In some embodiments, different modification rules may be applied for secret key exchange transmissions, payload transmissions, or both. In some embodiments, a certification indicating increased security by using the modification rules may be provided to a user.

Thus, systems and methods for providing secure electronic transmission have been described that operate to provide users, system providers, and various third-party service providers a secure communication system that may apply modification rules to perform additional modifications to encrypted messages for improved security. By applying the additional modification to the encrypted message and communicating the encrypted message, a secret key, and the modification rules using different communication channels, the difficulty for attackers to break the cryptography is increased. Furthermore, the modification rules may be changed dynamically (e.g., based on transmission security levels, a predetermined rotation frequency, network properties, transaction properties, transmission security risks, etc.), which further improves the security of the information transmission. Additionally, in some embodiments, a less complicated modification rule or no modification rule is applied with transmissions having a lower security risk or a lower transmission security level, and a more complicated modification rule is applied for transmissions having a higher security risk or a higher transmission security level, which reduces process time and improve system operating efficiency.

Figure 10:
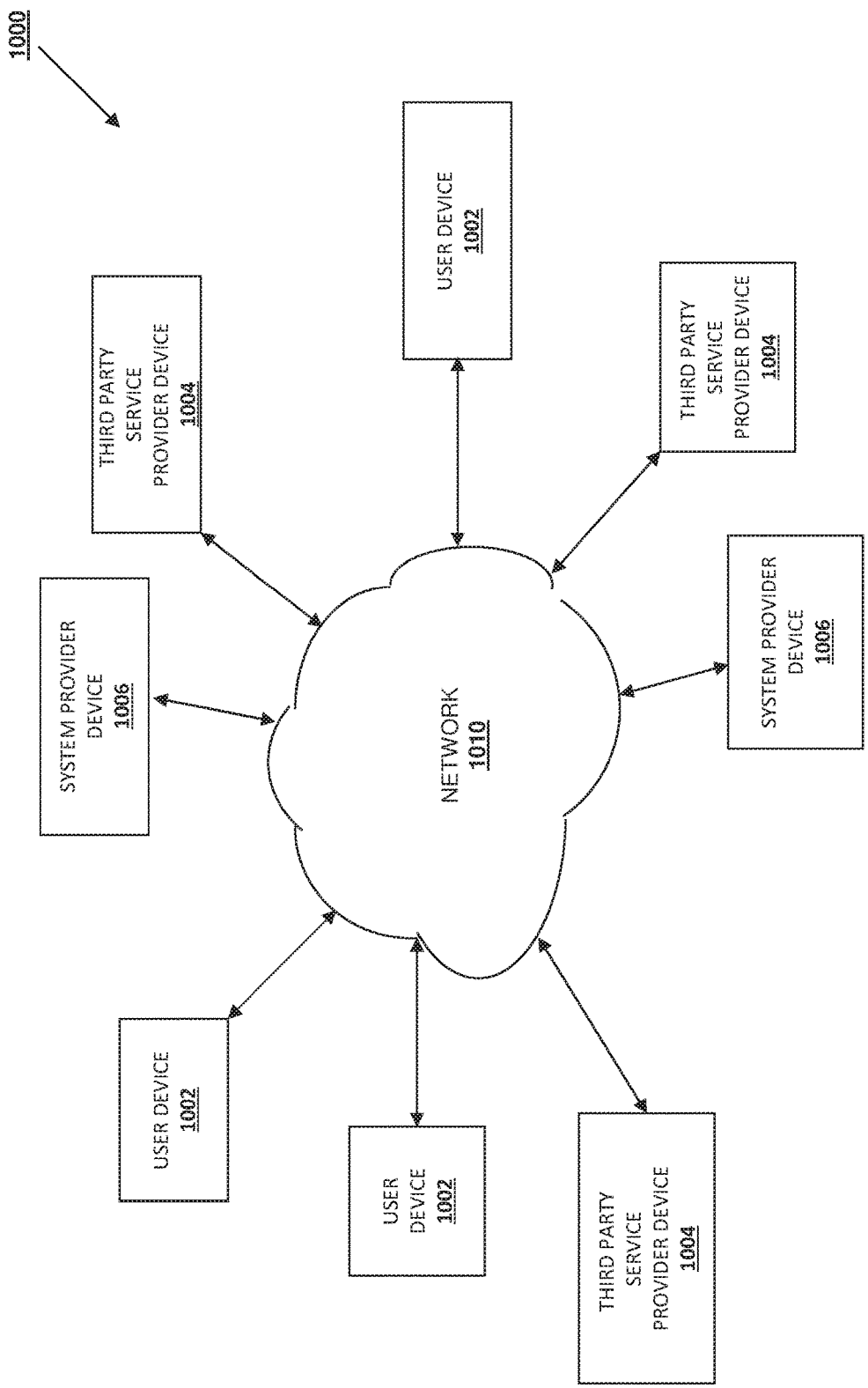
FIG. 10 is a schematic view illustrating an embodiment of a networked system.

Referring now to FIG. 10, an embodiment of a network-based system 1000 for implementing one or more processes described herein is illustrated. As shown, network-based system 1000 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 10 may be deployed in other ways and that the operations performed and/or the services provided by such servers may be combined or separated for a given implementation and may be performed by a greater number or fewer number of servers. One or more servers may be operated and/or maintained by the same or different entities.

The embodiment of the networked system 1000 illustrated in FIG. 10 includes one or more user devices 1002, one or more system provider devices 1006, and one or more third party service provider devices 1004 in communication over a network 1010. Any of the user devices 1002 may be a sender device 202 or a receiver device 204 discussed above. The system provider device 1006 may be a sender device 202 or a receiver device 204 discussed above and may be operated by a system provider such as, for example, PayPal Inc. of San Jose, Calif. The third party service provider device 1004 may be the service provider device providing transaction services and may be operated by various service providers including payment service providers, discount providers, marketplace providers, and/or any other service providers.

The user devices 1002, system provider devices 1006, and third party service provider devices 1004 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 1000, and/or accessible over the network 1010.

The network 1010 may be implemented as a single network or a combination of multiple networks. For example, in various embodiments, the network 1010 may include the Internet and/or one or more intranets, landline networks, wireless networks, and/or other appropriate types of networks.

The user device 1002 may be implemented using any appropriate combination of hardware and/or software configured for wired and/or wireless communication over network 1010. For example, in one embodiment, the user device 1002 may be implemented as a personal computer of a user in communication with the Internet. In some embodiments, the user device 1002 may be a wearable device. In some embodiments, the user device 1002 may be a smart phone, personal digital assistant (PDA), laptop computer, and/or other types of computing devices.

The user device 1002 may include one or more browser applications which may be used, for example, to provide a convenient interface to permit the customer to browse information available over the network 1010. For example, in one embodiment, the browser application may be implemented as a web browser configured to view information available over the Internet.

The user device 1002 may also include one or more toolbar applications which may be used, for example, to provide user-side processing for performing desired tasks in response to operations selected by the customer. In one embodiment, the toolbar application may display a user interface in connection with the browser application.

The user device 1002 may further include other applications as may be desired in particular embodiments to provide desired features to the user device 1002. In particular, the other applications may include an online payment transaction application provided by an online payment transaction provider. The other applications may also include security applications for implementing user-side security features, programmatic user applications for interfacing with appropriate application programming interfaces (APIs) over the network 1010, or other types of applications. Email and/or text applications may also be included, which allow the customer to send and receive emails and/or text messages through the network 1010. The user device 1002 includes one or more user and/or device identifiers which may be implemented, for example, as operating system registry entries, cookies associated with the browser application, identifiers associated with hardware of the user device 1002, or other appropriate identifiers, such as a phone number. In one embodiment, the user identifier may be used by the system provider device 1006, and/or the third party service provider device 1004 associate the user with a particular account as further described herein.

Figure 11:
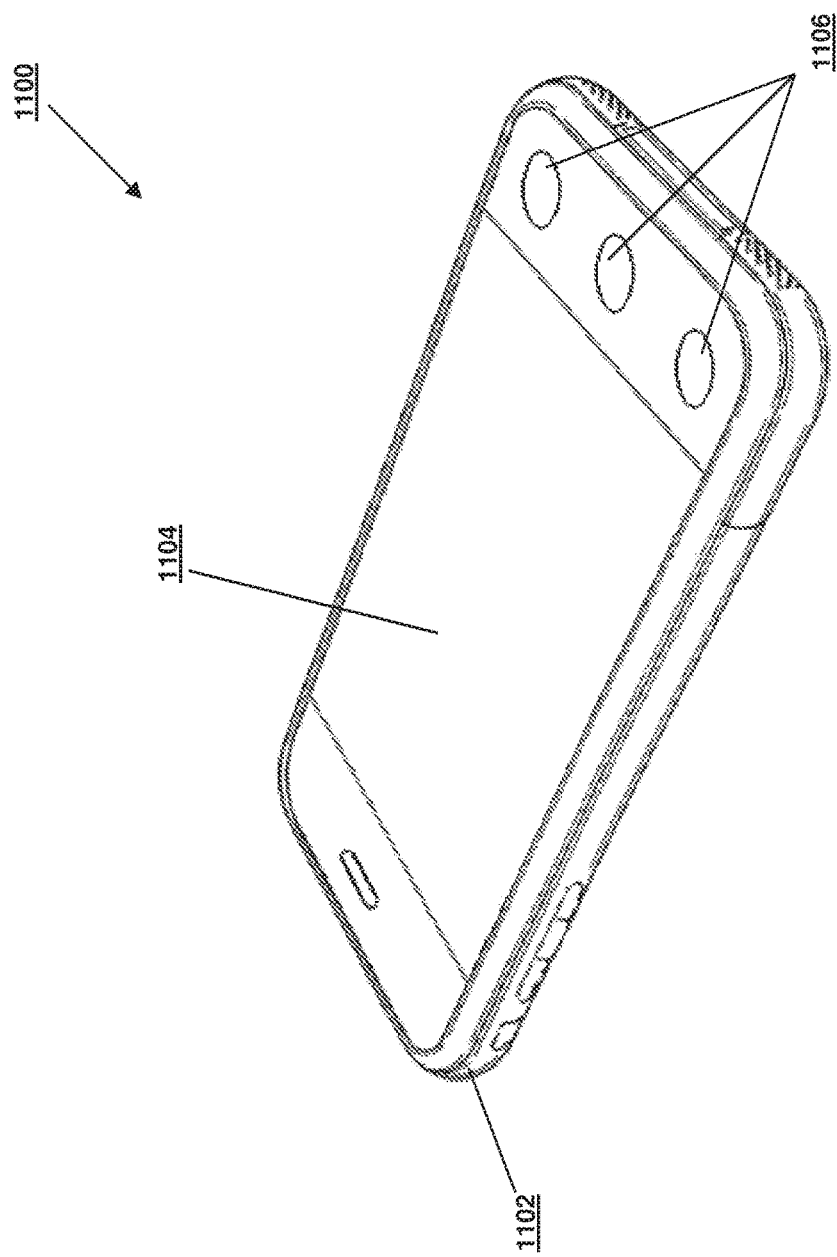
FIG. 11 is a perspective view illustrating an embodiment of a user device.

Referring now to FIG. 11, an embodiment of a user device 1100 is illustrated. The user device 1100 may be the user devices 200, 300, 300A, and 300B. The user device 1100 includes a chassis 1102 having a display 1104 and an input device including the display 1104 and a plurality of input buttons 1106. One of skill in the art will recognize that the user device 1100 is a portable or mobile phone including a touch screen input device and a plurality of input buttons that allow the functionality discussed above with reference to the method 100. However, a variety of other portable/mobile customer devices may be used in the method 100 without departing from the scope of the present disclosure.

Figure 12:
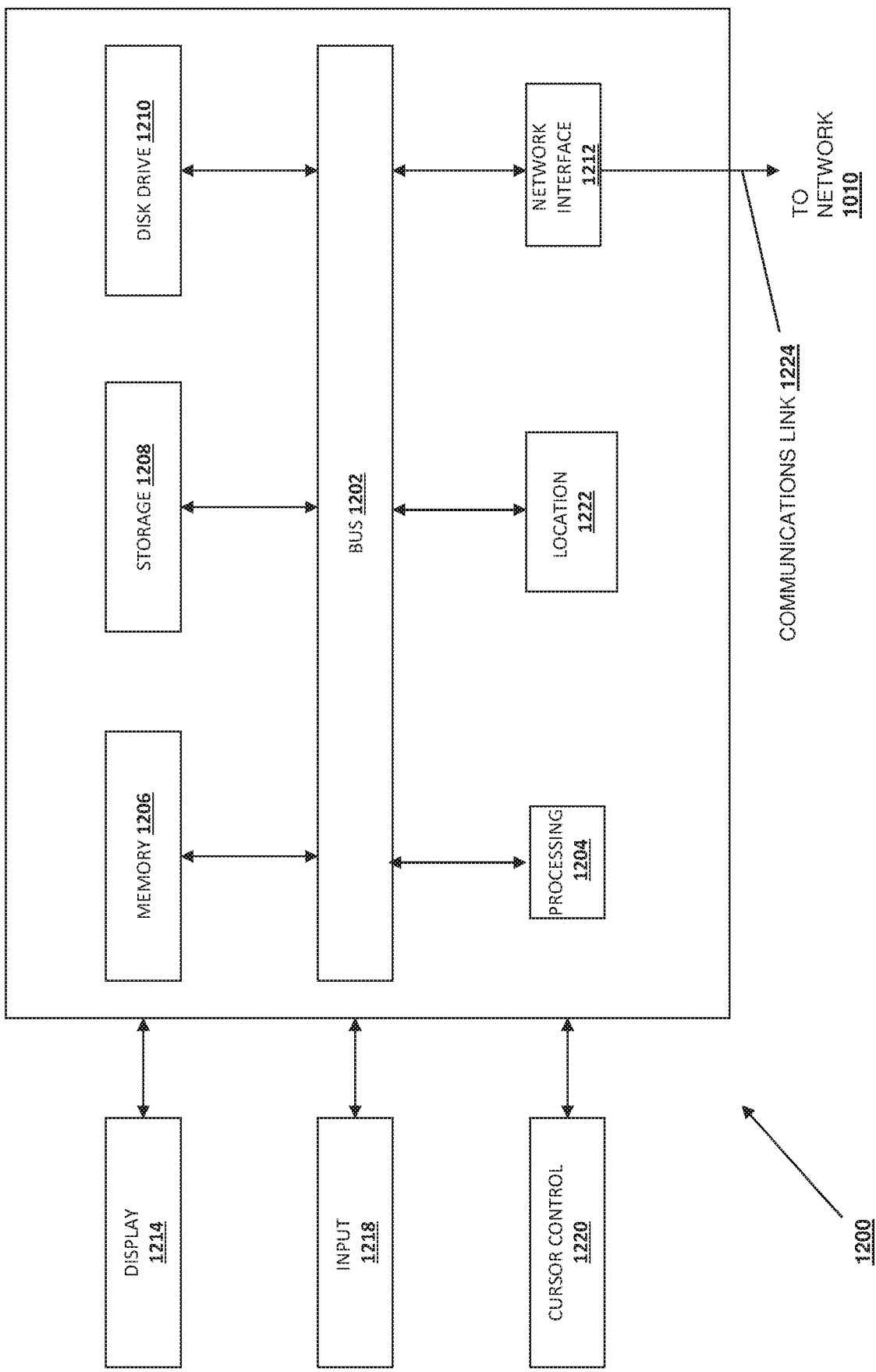
FIG. 12 is a schematic view illustrating an embodiment of a computer system.

Referring now to FIG. 12, an embodiment of a computer system 1200 suitable for implementing, for example, sender device 202, receiver device 204, user device 1002, system provider device 1006, and/or third-party service provider device 1004 is illustrated. It should be appreciated that other devices utilized by users, system providers, third party user information providers, third party service providers, and/or system providers in the system discussed above may be implemented as the computer system 1200 in a manner as follows.

In accordance with various embodiments of the present disclosure, computer system 1200, such as a computer and/or a network server, includes a bus 1202 or other communication mechanism for communicating information, which interconnects subsystems and components, such as a processing component 1204 (e.g., processor, micro-controller, digital signal processor (DSP), etc.), a system memory component 1206 (e.g., RAM), a static storage component 1208 (e.g., ROM), a disk drive component 1210 (e.g., magnetic or optical), a network interface component 1212 (e.g., modem or Ethernet card), a display component 1214 (e.g., CRT or LCD), an input component 1218 (e.g., keyboard, keypad, or virtual keyboard), a cursor control component 1220 (e.g., mouse, pointer, or trackball), and a location sensor component 1222 (e.g., a Global Positioning System (GPS) device as illustrated, a cell tower triangulation device, and/or a variety of other location determination devices known in the art). In one implementation, the disk drive component 1210 may comprise a database having one or more disk drive components.

In accordance with embodiments of the present disclosure, the computer system 1200 performs specific operations by the processor 1204 executing one or more sequences of instructions contained in the memory component 1206, such as described herein with respect to the sender device 202, receiver device 204, user devices 1002, service provider device 1006, and/or third-party service provider device 1004. Such instructions may be read into the system memory component 1206 from another computer readable medium, such as the static storage component 1208 or the disk drive component 1210. In other embodiments, hard-wired circuitry may be used in place of or in combination with software instructions to implement the present disclosure.

Logic may be encoded in a computer readable medium, which may refer to any medium that participates in providing instructions to the processor 1204 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 1210, volatile media includes dynamic memory, such as the system memory component 1206, and transmission media includes coaxial cables, copper wire, and fiber optics, including wires that comprise the bus 1202. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 1200. In various other embodiments of the present disclosure, a plurality of the computer systems 1200 coupled by a communication link 1224 to the network 1010 (e.g., such as a LAN, WLAN, PTSN, and/or various other wired or wireless networks, including telecommunications, mobile, and cellular phone networks) may perform instruction sequences to practice the present disclosure in coordination with one another.

The computer system 1200 may transmit and receive messages, data, information and instructions, including one or more programs (i.e., application code) through the communication link 1224 and the network interface component 1212. The network interface component 1212 may include an antenna, either separate or integrated, to enable transmission and reception via the communication link 1224. Received program code may be executed by processor 1204 as received and/or stored in disk drive component 1210 or some other non-volatile storage component for execution.

Figure 13:
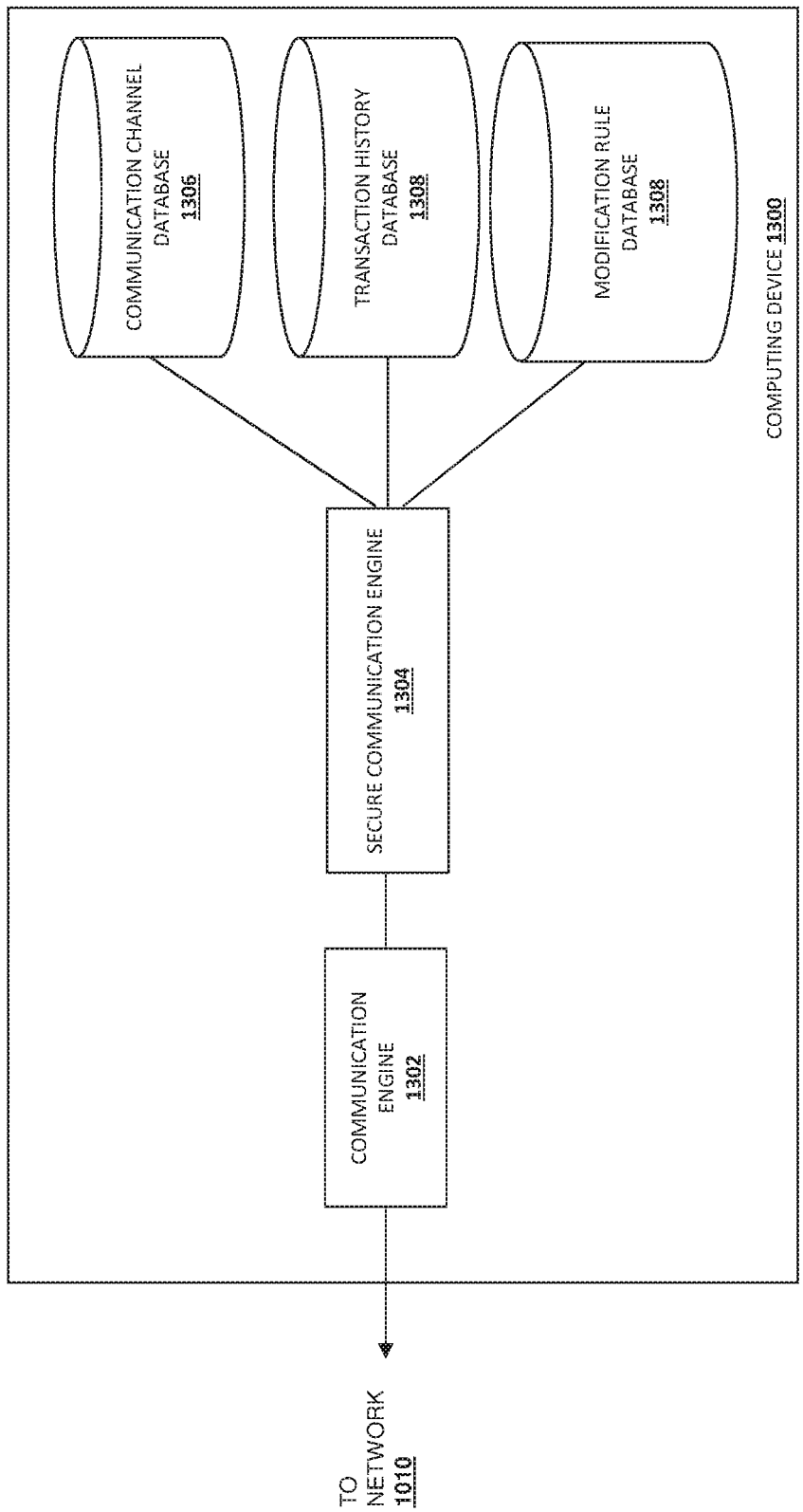
FIG. 13 is a schematic view illustrating an embodiment of a device that may be used as a sender device and/or a receiver device.

Referring now to FIG. 13, an embodiment of a device 1300 is illustrated. In an embodiment, the device 1300 may be a sender device 202 or a receiver device 204 discussed above. The device 1300 includes a communication engine 1302 that is coupled to the network 1010 and to a secure communication engine 1304 that is coupled to a communication channel database 1306, a transaction history database 1308, and a modification rule database 1310. The communication engine 1302 may be software or instructions stored on a computer-readable medium that allows the device 1300 to send and receive information over the network 1010. The secure communication engine 1304 may be software or instructions stored on a computer-readable medium that is operable to perform operations including transmitting, to a first device through a first communication channel, a modification rule message including a modification rule; encrypting a first message using a first key to generate an encrypted message; modifying the encrypted message based on the modification rule to generate a modified encrypted message; and transmitting, to the first device through a second communication channel, the modified encrypted message. Additionally, or alternatively, the operations may include receiving a modification rule; receiving an encrypted message; generating a modification reversed encrypted message by reversing the modification associated with the received encrypted message based on the modification rule; and decrypting the modification-reversed encrypted message to generate a decrypted received message. The operations may also provide any of the other functionality that is discussed above. While the databases 1306-1310 have been illustrated as separate from each other and located in the device 1300, one of skill in the art will recognize that any or all of the databases 1306-1310 may be combined and/or may be connected to the secure communication engine 1304 through the network 1010 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
transmitting, to a first device through a first communication channel, an encrypted modification rule message including an encrypted modification rule generated by encrypting a modification rule, wherein:
the modification rule is configured for use in at least one of modifying a first encrypted message to generate a modified encrypted message or reversing the modified encrypted message;
and
the modification rule includes one or more of a bit manipulation rule for the modifying the first encrypted message using a bit operation that performs a NOT operation to a plurality of bits of the first encrypted message at a plurality of predetermined locations or a false bit injection rule defining a false bit injection parameter for injecting a false bit into the first encrypted message for the modifying the first encrypted message;
encrypting a first message using a first key to generate the first encrypted message;
determining a transmission security level associated with transmitting the first encrypted message to the first device;
selecting a rule of the modification rule for modifying the first encrypted message based on the transmission security level;
modifying the first encrypted message according to the selected rule to generate the modified encrypted message; and
transmitting, to the first device through a second communication channel, the modified encrypted message.

2. The system of claim 1, wherein:
the first key is a public key associated with the first device; and
a private key associated with the first device enables decryption of the modified encrypted message by the first device.

3. The system of claim 1, wherein the first key includes a secret key used for decryption at the first device, and wherein the operations further comprise:
encrypting the secret key using a public key of the first device to generate an encrypted secret key message; and
transmitting, to the first device through a third communication channel, the encrypted secret key message,
wherein a private key associated with the first device enables decryption of the transmitted encrypted secret key message by the first device, and
wherein the secret key enables decryption of the transmitted modified encrypted message by the first device.

4. The system of claim 1, wherein the first communication channel comprises Email, Webpage, phone, fax, or Secure File Transfer Protocol (SFTP).

5. The system of claim 1, wherein the first communication channel is different from the second communication channel.

6. A method, comprising:
transmitting, to a first device through a first communication channel, an encrypted modification rule message including an encrypted modification rule generated by encrypting a modification rule, wherein:
the modification rule is configured for use in at least one of modifying a first encrypted message or reversing the modified encrypted message;
and
the modification rule includes one or more of a bit manipulation rule for the modifying the first encrypted message using a bit operation that performs a NOT operation to a plurality of predetermined bits of the first encrypted message or a false bit injection rule defining a false bit injection parameter for injecting a false bit into the first encrypted message for the modifying the first encrypted message;

encrypting a first message to generate the first encrypted message;

determining a transmission security level associated with transmitting the first encrypted message to the first device;

selecting a rule of the modification rule for modifying the first encrypted message based on the transmission security level;

modifying the first encrypted message according to the selected rule to generate the modified encrypted message; and transmitting, to the first device through a second communication channel, the modified encrypted message.

7. The method of claim 6, wherein: the first message is encrypted using a public key associated with the first device.

8. The method of claim 6, wherein the first message is encrypted using a secret key, wherein the method further comprises:

encrypting the secret key using a public key of the first device to generate an encrypted secret key message; and transmitting, to the first device through a third communication channel, the encrypted secret key message.

9. The method of claim 6, wherein the first communication channel comprises Email, Webpage, phone, fax, or Secure File Transfer Protocol (SFTP).

10. The method of claim 6, wherein the first communication channel is different from the second communication channel.

11. A non-transitory machine-readable medium having stored thereon machine-readable instructions executable to cause a machine to perform operations comprising:

transmitting, to a first device through a first communication channel, an encrypted modification rule message including an encrypted modification rule generated by encrypting a modification rule, wherein:

the modification rule is configured for use in at least one of modifying a first encrypted message to generate a modified encrypted message or reversing the modified encrypted message; and the modification rule includes one or more of a bit manipulation rule for the modifying the first encrypted message using a bit operation that reverses a plurality of bits of the first encrypted message at a plurality of predetermined locations or a false bit injection rule defining a false bit injection parameter for injecting a false bit into the first encrypted message for the modifying the first encrypted message;

encrypting a first message using a first key to generate the first encrypted message;

determining a transmission security level associated with transmitting the first encrypted message to the first device;

selecting a rule of the modification rule for modifying the first encrypted message based on the transmission security level;

modifying the first encrypted message according to the selected rule to generate the modified encrypted message; and transmitting, to the first device through a second communication channel, the modified encrypted message.

12. The non-transitory machine-readable medium of claim 11, wherein: the first key is a public key associated with the first device.

13. The non-transitory machine-readable medium of claim 11, wherein the first key includes a secret key for decryption at the first device, wherein the operations further comprise:

encrypting the secret key using a public key of the first device to generate an encrypted secret key message; and transmitting, to the first device through a third communication channel, the encrypted secret key message.

14. The non-transitory machine-readable medium of claim 11, wherein the first communication channel comprises Email, Webpage, phone, fax, or Secure File Transfer Protocol (SFTP).

15. The system of claim 1, wherein the encrypted modification rule is configured to be decrypted at the first device to recover the modification rule such that the modification rule is able to be used by the first device to reverse the modified encrypted message.

16. The system of claim 1, wherein the false bit injection parameter includes one or both of a pattern of the false bit and a location in the first encrypted message for the injecting the false bit into the first encrypted message.

17. The system of claim 1, wherein the transmission security level is determined based on a property of a device of the system configured to transmit the first encrypted message.

18. The method of claim 6, wherein the transmission security level is determined based on a type of a transaction that includes the transmitting the first encrypted message or a time the transaction is occurring.

19. The method of claim 6, wherein the modification rule is configured to be changed based on a type of a transaction that includes the transmitting the first encrypted message, the type of the transaction including a payment transaction.

20. The non-transitory machine-readable medium of claim 11, wherein the first communication channel is different from the second communication channel.

* * * * *